(12) United States Patent
Murase et al.

(10) Patent No.: US 10,895,277 B2
(45) Date of Patent: Jan. 19, 2021

(54) WELDED JOINT

(71) Applicant: UACJ Corporation, Tokyo (JP)

(72) Inventors: Takashi Murase, Tokyo (JP); Shohei Yomogida, Tokyo (JP); Toshihiko Fukuda, Tokyo (JP)

(73) Assignee: UACJ Corporation, Tokyo (JP)

( * ) Notice: Subject to any disclaimer, the term of this patent is extended or adjusted under 35 U.S.C. 154(b) by 464 days.

(21) Appl. No.: 15/949,729

(22) Filed: Apr. 10, 2018

(65) Prior Publication Data

US 2018/0298932 A1 Oct. 18, 2018

(30) Foreign Application Priority Data

Apr. 12, 2017 (JP) ................. 2017-078927

(51) Int. Cl.
| | |
|---|---|
| *B23K 26/323* | (2014.01) |
| *F16B 5/08* | (2006.01) |
| *B23K 26/244* | (2014.01) |
| *B23K 26/242* | (2014.01) |
| *B23K 26/211* | (2014.01) |
| *B23K 9/23* | (2006.01) |
| *B23K 9/167* | (2006.01) |
| *B23K 103/18* | (2006.01) |
| *B23K 103/12* | (2006.01) |
| *B23K 103/10* | (2006.01) |

(52) U.S. Cl.
CPC ............... *F16B 5/08* (2013.01); *B23K 9/167* (2013.01); *B23K 9/232* (2013.01); *B23K 26/211* (2015.10); *B23K 26/242* (2015.10); *B23K 26/244* (2015.10); *B23K 26/323* (2015.10); *B23K 2103/10* (2018.08); *B23K 2103/12* (2018.08); *B23K 2103/18* (2018.08)

(58) Field of Classification Search
CPC .... B23K 26/211; B23K 26/24; B23K 26/242; B23K 26/244; B23K 26/323; B23K 9/167; B23K 9/232; B23K 2103/10; B23K 2103/18; F16B 5/08
See application file for complete search history.

(56) References Cited

U.S. PATENT DOCUMENTS

| | | | | |
|---|---|---|---|---|
| 3,857,165 A | * | 12/1974 | Vernam | B23K 35/286 228/262.5 |
| 5,599,467 A | * | 2/1997 | Okabe | B23K 11/185 219/118 |
| 6,170,738 B1 | * | 1/2001 | Otsuka | B23K 35/288 228/262.51 |
| 6,336,583 B1 | * | 1/2002 | Wang | B23K 33/00 228/175 |

(Continued)

FOREIGN PATENT DOCUMENTS

| | | |
|---|---|---|
| JP | 2011005499 A | 1/2011 |
| JP | 5431797 B2 * | 3/2014 |

*Primary Examiner* — Joshua T Kennedy
(74) *Attorney, Agent, or Firm* — Dorsey & Whitney LLP

(57) ABSTRACT

A welded joint comprising an aluminum-based base material comprising an aluminum alloy or pure aluminum and a copper-based base material comprising a copper alloy or pure copper joined by a weld metal portion is provided. The weld metal portion contains copper in ranges of less than 75% by mass and silicon in ranges of less than 13% by mass and has a higher content of copper and silicon than the aluminum-based base material.

8 Claims, 2 Drawing Sheets

(56) References Cited

U.S. PATENT DOCUMENTS

| | | | | |
|---|---|---|---|---|
| 6,579,386 | B1* | 6/2003 | Bjorkman, Jr. | B23K 35/286 |
| | | | | 148/437 |
| 10,378,091 | B2* | 8/2019 | Jotoku | B23K 35/30 |
| 2002/0197506 | A1* | 12/2002 | Ueno | B23K 35/288 |
| | | | | 428/654 |
| 2017/0114810 | A1* | 4/2017 | Angerhausen | B23K 9/235 |
| 2018/0354059 | A1* | 12/2018 | Hirata | B23K 35/3086 |
| 2019/0039165 | A1* | 2/2019 | Fujimura | C22C 38/54 |
| 2019/0061053 | A1* | 2/2019 | Yang | B23K 26/10 |
| 2020/0141434 | A1* | 5/2020 | Sugimura | B23K 26/0626 |

\* cited by examiner

WELDED JOINT

CROSS REFERENCE TO RELATED APPLICATIONS

This application claims the benefit of Japanese Patent Application No. 2017-078927, filed on Apr. 12, 2017, which is hereby incorporated by reference in its entirety.

BACKGROUND

Technical Field

The present disclosure relates to a welded joint comprising an aluminum-based base material comprising an aluminum alloy or pure aluminum and a copper-based base material comprising a copper alloy or pure copper joined by a weld metal portion.

Background

Generally, copper-based materials comprising copper alloys or pure copper have high electrical conductivity and are therefore used for, for example, electrodes and bus bars for Li ion batteries, and electrodes, terminals, and wiring for electronic devices and wire harnesses. In recent years, from the viewpoint of environmental protection, the research and development of hybrid cars, electric cars, and the like has been rapidly advanced, and weight reduction is required of Li ion batteries, electronic devices, electrical parts, and the like mounted in these cars and the like. In order to achieve the weight reduction of these power sources, electrical parts, and the like, forming some of the electrodes, the terminals, and the like with aluminum-based materials comprising aluminum alloys or pure aluminum instead of copper-based materials is studied.

In other words, in the above electrical parts and the like, electrodes, terminals, and the like comprising copper-based materials, and electrodes, terminals, and the like comprising aluminum-based materials are mixed, and therefore techniques for joining these different types of metals to each other are needed. Examples of the methods of joining of different types of metals to each other include ultrasonic joining, MIG welding, TIG welding, friction stir welding (FSW), and laser welding. In welding methods typified by MIG welding, laser welding, and the like among these, access to base materials is possible from one side, and welding is possible in a noncontact manner, and therefore the welding methods are known as methods having high flexibility.

In the welding of different types of materials, an aluminum-based base material and a copper-based base material, to each other, the difference in the melting points of the respective base materials, intermetallic compounds formed in the weld metal portion, and the like are problematic. Particularly the intermetallic compounds formed in the weld metal portion significantly decrease the strength and electrical conductivity of the welded joint, and therefore it is necessary to thin the intermetallic compound layer. As studies for thinning intermetallic compound layers, a method of performing welding using a laser having high energy density (Japanese Patent Application Laid-Open No. 2011-005499), and the like are proposed, but a problem is that the strength and ductility of the welded joint are insufficient.

The present disclosure is related to providing a welded joint having high joint strength and having excellent ductility by joining an aluminum-based base material and a copper-based base material by a weld metal portion made proper.

SUMMARY

The present inventors have diligently conducted many studies and as a result have found that in a welded joint comprising an aluminum-based base material and a copper-based base material joined by a weld metal portion, by adjusting the content of components, particularly at least copper (Cu) and silicon (Si), in the weld metal portion in a proper range, the joint strength and the ductility improve remarkably, leading to the completion of the present disclosure.

Specifically, some embodiments of the present disclosure are as follows.

(1) A welded joint comprising an aluminum-based base material comprising an aluminum alloy or pure aluminum and a copper-based base material comprising a copper alloy or pure copper joined by a weld metal portion,
wherein the weld metal portion contains copper in ranges of less than 75% by mass and silicon in ranges of less than 13% by mass and has a higher content of copper and silicon than the aluminum-based base material.
(2) The welded joint according to the above (1), wherein the weld metal portion further contains zinc in a range of 30% by mass or less and has a higher content of zinc than the aluminum-based base material.
(3) The welded joint according to the above (1) or (2), wherein copper content of the weld metal portion is less than 75% by mass when the weld metal portion is measured at a position in the weld metal portion 300 μm away from a boundary surface between the copper-based base material and the weld metal portion.
(4) The welded joint according to any one of the above (1) to (3), wherein the weld metal portion further contains iron, and the iron is present in a concentrated state at a surface of the weld metal portion.

The present disclosure relates to a welded joint comprising an aluminum-based base material comprising an aluminum alloy or pure aluminum and a copper-based base material comprising a copper alloy or pure copper joined by a weld metal portion, wherein the weld metal portion contains copper in ranges of less than 75% by mass and silicon in ranges of less than 13% by mass and has a higher content of copper and silicon than the aluminum-based base material. Thus, it is possible to provide the welded joint having high joint strength and having excellent ductility.

DETAILED DESCRIPTION

Thereafter, embodiments of the welded joint according to the present disclosure will be described below with reference to the accompanying drawings.

Figure 1:
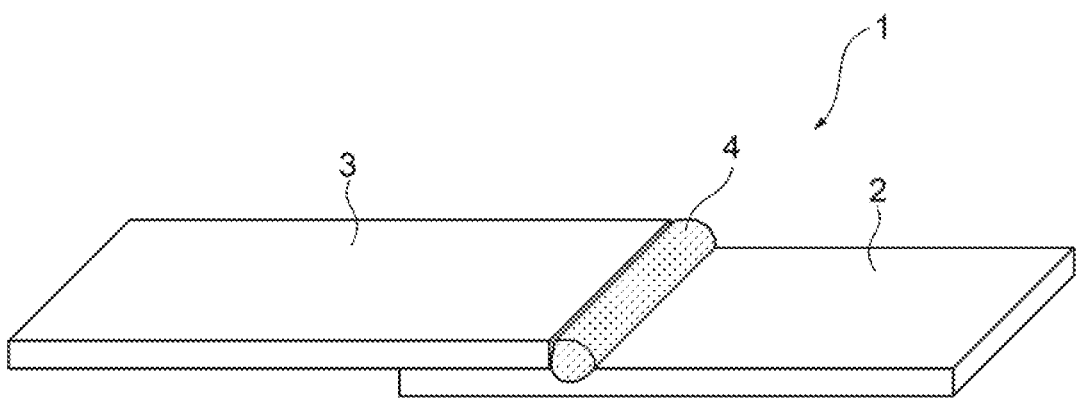
FIG. 1 is a schematic perspective view of a welded joint being an embodiment according to the present disclosure.

FIG. 1 shows a welded joint being an embodiment according to the present disclosure.

The illustrated welded joint 1 comprises an aluminum-based base material 2 comprising an aluminum alloy or pure aluminum and a copper-based base material 3 comprising a copper alloy or pure copper joined by a weld metal portion 4.

The aluminum alloy is not particularly limited, and examples of the aluminum alloy include Al—Mn-based alloys (JIS 3000-based alloys), Al—Mg-based alloys (JIS 5000-based alloys), and Al—Mg—Si alloys (JIS 6000-based alloys), and examples of the pure aluminum include JIS 1000-based alloys. Specific examples are A1100, A1050, A3003, A3004, A5052, A5083, A6061, and the like.

The copper alloy is not particularly limited, and examples of the copper alloy include Cu—Zn-based alloys (brass) and Cu—Sn-based alloys (bronze), and examples of the pure copper include oxygen-free copper, tough pitch copper, and phosphorus-deoxidized copper. Specific examples are C1020, C1100, C1201, C2600, C5191, C6191, and the like.

In the welded joint 1 of the present disclosure, in the weld metal portion 4, copper is contained in the ranges of less than 75% by mass and silicon is contained in the range of less than 13% by mass, and the content of copper and silicon is made higher than in the aluminum-based base material 2. Thus, a welded joint having high joint strength and having excellent ductility can be provided. Hereinafter, the reason for the limitation of the content of copper and silicon in the weld metal portion 4 will be described.

(I) Copper and silicon being contained in the ranges of less than 75% by mass and less than 13% by mass respectively, and the content of copper and silicon being made higher than in the aluminum-based base material 2

During welding, the aluminum-based base material 2 having a lower melting point than the copper-based base material 3 melts in the vicinity of the joining portion, and the strength tends to decrease in a melted site and a site where structure change occurs due to heat input in the welding, compared with strength in the surrounding site with no change. The present inventors have made a study for compensating for strength decrease accompanying metal structure change due to welding, and the like, based on the finding that copper (Cu) and silicon (Si) can improve the strength of aluminum by the addition of proper amounts. As a result, the present inventors have succeeded in forming a welded joint having high joint strength and excellent ductility by arranging the weld metal portion 4 being the joining portion so that copper is contained in the range of less than 75% by mass and silicon is contained in the range of less than 13% by mass, and the content of copper and silicon is made higher, preferably 0.5% by mass or more higher, than in the aluminum-based base material 2. When at least one of the content of Cu and the content of Si in the weld metal portion 4 is higher than the above proper ranges, the ductility of the weld metal portion 4 decreases significantly.

Figure 4:
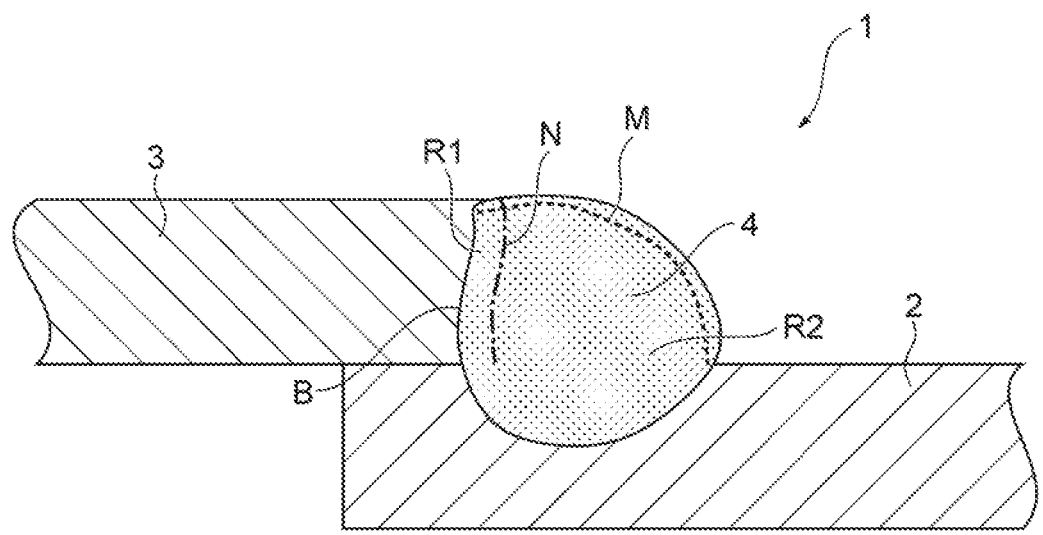
FIG. 4 is a schematic cross-sectional view when a welded joint comprising an aluminum-based base material and a copper-based base material joined by a weld metal portion is cut perpendicularly to the welding direction.

In the present disclosure, it may be preferred that the copper content when measured at a position in the weld metal portion (weld bead) 4 300 μm away from a boundary surface B between the copper-based base material 3 and the weld metal portion 4 is less than 75% by mass. In the welding of the aluminum-based base material 2 and the copper-based base material 3, the boundary surface B and its vicinity region in the weld metal portion 4, more specifically the region R1 of the weld metal portion 4 divided by the boundary surface B between the copper-based base material 3 and the weld metal portion 4 and a line drawn at a position N 300 μm away from this boundary surface B (shown by the dot-and-dash line in FIG. 4), as shown in FIG. 4, are a region close to the copper-based base material 3, and mixing with the aluminum-based base material 2 does not proceed, and therefore the Cu content is higher than in another region R2. Particularly when a region having a Cu content of 75% or more is present in a wide range in the weld metal portion 4, the ductility of the weld metal portion 4 tends to decrease. Thus, it is preferred that even if the region having a content of Cu of 75% or more is present in the weld metal portion 4, the region is only in the boundary surface B between the copper-based base material 3 and the weld metal portion 4 and the region R1 being its vicinity region, and the copper content when measured in the region R2 being at a position 300 μm or more away from the boundary surface B is less than 75% by mass. For the quantitative analysis of the copper content in the weld metal portion, for example, the weld metal portion (weld bead portion) is cut from the obtained welded joint in the direction perpendicular to the welding direction, mirror finish is performed by polishing, then the region of the weld metal portion 4 is grasped from a composition image of a scanning electron microscope (SEM), and then point analysis is performed by an electron probe microanalyzer (EPMA), and in the analysis, by comparing with the analysis results of standard samples of elements, quantification can be performed.

(II) In the present disclosure, proper amounts of copper and silicon are contained in the weld metal portion 4 as described above, and zinc (Zn), iron (Fe), manganese (Mn), magnesium (Mg), and phosphorus (P) can be further contained as needed.

(i) Zinc (Zn) being further contained in the range of 30% by mass or less, and the content of zinc being made higher than in the aluminum-based base material 2

It may be preferred that the weld metal portion 4 further contains zinc (Zn) in the range of 30% by mass or less, and the content of zinc is made higher than in the aluminum-based base material 2. Further adding zinc in the range of 30% by mass or less to the weld metal portion 4, in addition to the addition of proper amounts of Cu and Si described above, can effectively improve strength and is therefore preferred for compensating for a decrease in the strength of the joining portion accompanying metal structure change due to welding, and the like. The zinc content in the weld metal portion 4 is set at 30% by mass or less because when the zinc content is higher than 30% by mass, the ductility of the weld metal portion 4 tends to decrease. It is preferred that the zinc (Zn) content in the weld metal portion 4 is made 0.8% by mass or more higher, more preferably 1.0% by mass or more higher, than zinc content in the aluminum-based base material 2. Further, in order to exhibit the effect of compensating for a decrease in the strength of the joining portion accompanying metal structure change due to welding, and the like, it is preferred that the lower limit value of the zinc content in the weld metal portion 4 is set at 0.5% by mass.

(ii) Iron (Fe) being further contained, and this iron being present in a concentrated state at the surface of the weld metal portion Further, in the present disclosure, it may be preferred that the weld metal portion 4 further contains iron (Fe), and this iron is present in a concentrated state at the surface of the weld metal portion 4 because by Fe being present in a concentrated state at the surface of the weld metal portion (weld bead) 4, deformation at the surface of the weld metal portion 4 is inhibited, and the effect of improving the strength is achieved. When a large amount of Fe is present to the central portion of the weld metal portion 4, the ductility of the weld metal portion 4 may decrease. It is preferred that the content of Fe present at the surface of the weld metal portion 4 is 3 times or more average Fe content when measured in the entire weld metal portion 4. It is preferred that the content of Fe present at the surface of the weld metal portion 4 is in the range of 0.5 to 2.0% by mass, and it is preferred that for Fe content when measured in the entire weld metal portion 4, the average value of the Fe content is 0.1 to 2.0% by mass. For the quantitative analysis of the content of Fe present at the surface (surface layer) of the weld metal portion, for example, the weld metal portion (weld bead portion) 4 is cut from the obtained welded joint in the direction perpendicular to the welding direction, mirror finish is performed by polishing, then the weld metal portion region is grasped from a composition image of a scanning electron microscope (SEM), and then point analysis is performed by an electron probe microanalyzer (EPMA) on a line drawn at a position M 50 μm inside from the surface of the weld metal portion (shown by the broken line in FIG. 4), and in the analysis, by comparing with the analysis results of standard samples of elements, quantification can be performed.

(iii) 2.0% by mass or less of manganese (Mn), 4.0% by mass or less of magnesium (Mg), and 1.0% by mass or less of phosphorus (P) being contained Mn is a component having the action of the improvement of the ductility of the weld metal portion and can therefore be added with an upper limit of 2.0% by mass. When the Mn content exceeds 2.0% by mass, coarse intermetallic compounds are formed, and the ductility may decrease.

Mg is a component having the action of the improvement of the strength of the weld metal portion and can therefore be added with an upper limit of 4.0% by mass. When the Mg content exceeds 4.0% by mass, the corrosion resistance of the weld metal portion may decrease.

P is a component having the action of the improvement of the ductility of the weld metal portion and can therefore be added with an upper limit of 1.0% by mass. When the P content exceeds 1.0% by mass, coarse intermetallic compounds are formed, and the ductility may decrease.

[Manufacturing Method for Welded Joint]

Thereafter, a method for manufacturing the welded joint of the present disclosure will be described while specifically illustrated below.

In the present disclosure, a melt welding method such as arc welding, laser welding, or electron beam welding is applied. In order to adjust the components of the weld metal portion, a filler metal can be used as needed. When a filler metal is used, a filler metal in a rod form, a wire form, a foil form, a powder form, or the like is appropriately selected. Particularly, using a filler metal in a powder form is suitable for manufacturing a lap-welded joint or a lap fillet-welded joint because the influence of volume decrease in the melting and solidification process is reduced. When it is necessary to improve the filling rate of the powder, a dispersing material comprising polyethylene glycol, a polyether, or the like may be used.

Examples of the filler metal used include Al—Cu—Si-based or Al—Cu—Si—Zn-based alloys. By using a filler metal based on such an alloy, it is possible to adjust the alloy composition of the weld metal portion within the prescribed range. In the filler metal, it is necessary to appropriately change the composition according to the compositions of the aluminum-based base material and the Cu-based base material used, and, for example, it is desired to use a filler metal comprising an Al—Cu—Si-based alloy of 30% by mass or less of Cu and 13% by mass or less of Si. Further, when Zn is also added to the weld metal portion, it is desired to use a filler metal comprising an Al—Cu—Si—Zn-based alloy of 30% by mass or less of Cu, 13% by mass or less of Si, and 30% by mass or less of Zn.

The above-described parts only show some embodiments of this disclosure, and various changes can be made in the claims. In FIG. 1, a case where the welded joint is a lap joint (fillet lap joint) is shown, but the present disclosure is not limited to only such a welded joint and can be various welded joints according to the application, such as a butt joint, a corner joint, and a T-joint.

EXAMPLES

Hereinafter, a description will be given in more detail based on the Examples of the present disclosure, but the present disclosure is not limited to these.

Examples 1 to 51 and Comparative Examples 1 to 6

Figure 2:
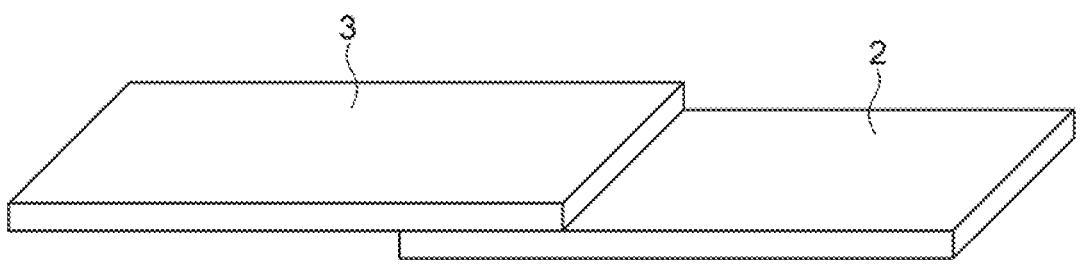
FIG. 2 is a schematic perspective view showing a state before joining in which an end portion of a copper-based base material is only superimposed on an end portion of an aluminum-based base material.
Figure 3:
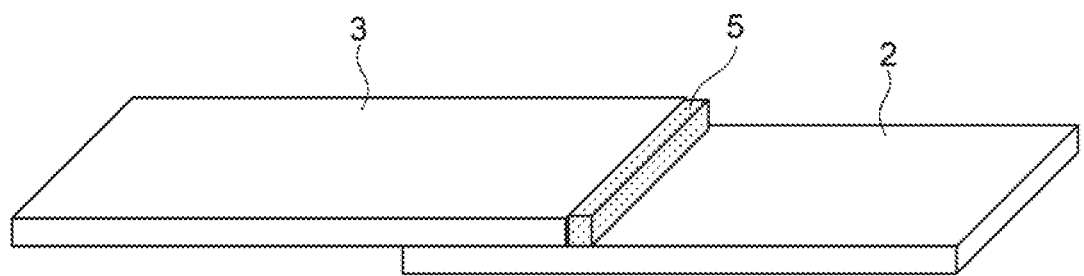
FIG. 3 is a schematic perspective view showing a state before joining when an end portion of a copper-based base material is superimposed on an end portion of an aluminum-based base material, and then a powder filler metal is placed so as to be in contact with the copper end face located on the aluminum-based base material.

A copper-based base material 3 of length 100 mm×width 50 mm×thickness 1 mm was placed on an aluminum-based base material 2 of length 100 mm×width 50 mm×thickness 1 mm so as to be superimposed in the range of length direction dimension 30 mm×width direction dimension 50 mm as shown in FIG. 2. Thereafter, a powder filler metal 5 was placed so as to be in contact with the total length of the end face of the copper-based base material 3 located on the aluminum-based base material 2, as shown in FIG. 3. In some Examples, an iron powder was further placed on the powder filler metal 5. As the powder filler metal, eight types of powder filler metals Nos. 1 to 8 are shown in Table 1. The powder filler metals Nos. 1 to 8 all contain at least Al, Si, and Fe, and Nos. 2 to 4 and 6 to 8 contain Cu, and further, Nos. 3, 5, and 8 also contain Zn.

The types of the aluminum-based base material 2 and the copper-based base material 3, the type of the powder filler metal (No. in Table 1), the amount of the powder filler metal added (g) per mm of weld length, whether or not the iron powder is placed on the powder filler metal, the amount of the iron powder added (g) per mm of weld length, and the welding method are shown in Table 2.

Further, as the aluminum-based base material, any of A1050 (pure Al), A3003 (Al—Mn-based alloy), A5052 (Al—Mg-based alloy), A5083 (Al—Mg-based alloy), and A6061 (Al—Mg—Si-based alloy) was used, and as the copper-based base material, any of C1100 (tough pitch copper), C1020 (oxygen-free copper), C1220 (phosphorus-deoxidized copper), and C2100 (brass) was used.

The composition components of A1050, A3003, A5052, A5083, and A6061 used in the Examples and Comparative examples are as follows.

[A1050]

Cu: 0.01% by mass, Si: 0.15% by mass, Zn: 0.01% by mass, Fe: 0.20% by mass, balance Al

[A3003]
Cu: 0.10% by mass, Si: 0.25% by mass, Zn: 0.05% by mass, Fe: 0.30% by mass, Mn: 1.25% by mass, balance Al
[A5052]
Cu: 0.02% by mass, Si: 0.10% by mass, Zn: 0.01% by mass, Fe: 0.20% by mass, Mg: 2.50% by mass, Cr: 0.20% by mass, balance Al
[A5083]
Cu: 0.01% by mass, Si: 0.10% by mass, Zn: 0.05% by mass, Fe: 0.20% by mass, Mn: 0.70% by mass, Mg: 4.50% by mass, Cr: 0.10% by mass, balance Al
[A6061]
Cu: 0.25% by mass, Si: 0.50% by mass, Zn: 0.10% by mass, Fe: 0.40% by mass, Mg: 1.0% by mass, Cr: 0.10% by mass, balance Al The welding was carried out by laser welding or TIG welding. In the laser welding, laser light output from a fiber laser was passed through a collimator lens and an fθ lens and adjusted so that the spot diameter was a diameter of 600 μm. The laser welding was performed at a welding output of 1000 W. The welding speed was set at 1000 mm/min, and the irradiation position of the laser was set at a position on the aluminum-based base material 2 side 500 μm away from the end face of the copper-based base member 3. In the TIG welding, the powder filler metal 5 manually placed and the surrounding base material (aluminum-based base material 2) were melted and joined. The welding current was set at 150 A, and the welding was performed downward with a speed of 30 cm/min as a rough standard.

For the welded joints fabricated above, the composition analysis of the weld metal portion and the aluminum-based base material, and a tensile shear test were carried out. The details of each evaluation will be described below.

<Composition Analysis of Weld Metal Portion>

The weld metal portion (weld bead portion) was cut from the obtained welded joint in the direction perpendicular to the welding direction, and mirror finish was performed by polishing. Then, the weld metal portion region was grasped from a composition image of an SEM, and then the composition was analyzed by point analysis by an EPMA. In the analysis, by comparing with the analysis results of standard samples of elements, quantification was performed. For measurement, a beam having a spot diameter of 50 μm was used, and the entire weld metal portion was analyzed at intervals of 100 μm in the thickness direction and width direction of the weld metal portion. The elements used as analysis targets were Cu, Si, Zn, Fe, Mn, Mg, and P. From the obtained analysis results, the average content (% by mass) of Cu, Si, Zn, Fe, Mn, Mg, and P in the entire weld metal portion, Cu content (% by mass) when measured on a line drawn at a position N in the weld metal portion 300 μm away from the boundary surface B between the copper-based base material 3 and the weld metal portion 4 (shown by the dot-and-dash line in FIG. 4), and the content (% by mass) of Fe present at the surface (surface layer) of the weld metal portion were each calculated.

<Tensile Shear Test>

For each welded joint obtained, both width ends were each cut by 7.5 mm to fabricate a sample in a strip form having the width decreased to 35 mm. A tensile shear test was performed using this sample as a test piece, and the maximum load (N) being the tensile load when the test piece broke was obtained, and the ductility (%) was calculated. For the evaluation of the ductility, the total width of the weld metal portion before and after the test was measured, and the ductility was calculated by [(amount of change in weld metal portion width before and after test)/(width of weld metal portion before test)]×100(%). In the present Examples, for joint strength, a case where the above maximum load was 400 N or more was evaluated as being at an acceptable level, and for the ductility, a case where the numerical value calculated by the above formula was 1.0% or more was evaluated as being at an acceptable level. Their evaluation results are shown in Table 3.

TABLE 1

| | Component composition (% by mass) | | | | |
|---|---|---|---|---|---|
| Filler metal No. | Cu | Si | Zn | Fe | Al |
| 1 | 0 | 15 | 0 | 0.2 | Balance |
| 2 | 40 | 15 | 0 | 0.2 | Balance |
| 3 | 40 | 15 | 20 | 0.2 | Balance |
| 4 | 75 | 7 | 0 | 0.2 | Balance |
| 5 | 0 | 7 | 40 | 0.2 | Balance |
| 6 | 40 | 15 | 0 | 3.5 | Balance |
| 7 | 40 | 0.2 | 0 | 0.2 | Balance |
| 8 | 40 | 15 | 40 | 0.2 | Balance |

TABLE 2

| | | | Filler metal | | | | |
|---|---|---|---|---|---|---|---|
| | Al-based base material Type | Copper-based base material Type | Filler metal No. | Amount of filler metal added (g) per mm of weld length | Whether or not iron powder is placed on filler metal | Amount of iron powder added (g) per mm of weld length | Welding method |
| Example 1 | A1050 | C1100 | 1 | 1 | Not placed | 0 | Laser welding |
| Example 2 | A1050 | C1100 | 1 | 3 | Not placed | 0 | Laser welding |
| Example 3 | A1050 | C1100 | 2 | 1 | Not placed | 0 | Laser welding |
| Example 4 | A1050 | C1100 | 2 | 3 | Not placed | 0 | Laser welding |
| Example 5 | A1050 | C1100 | 3 | 1 | Not placed | 0 | Laser welding |
| Example 6 | A1050 | C1100 | 3 | 3 | Not placed | 0 | Laser welding |
| Example 7 | A1050 | C1100 | 4 | 1 | Not placed | 0 | Laser welding |
| Example 8 | A1050 | C1100 | 5 | 1 | Not placed | 0 | Laser welding |
| Example 9 | A1050 | C1100 | 1 | 1 | Placed | 0.01 | Laser welding |
| Example 10 | A1050 | C1100 | 2 | 1 | Placed | 0.01 | Laser welding |
| Example 11 | A1050 | C1100 | 3 | 1 | Placed | 0.01 | Laser welding |
| Example 12 | A3003 | C1100 | 1 | 1 | Not placed | 0 | Laser welding |
| Example 13 | A3003 | C1100 | 2 | 1 | Not placed | 0 | Laser welding |
| Example 14 | A3003 | C1100 | 3 | 1 | Not placed | 0 | Laser welding |
| Example 15 | A3003 | C1100 | 3 | 3 | Not placed | 0 | Laser welding |
| Example 16 | A3003 | C1100 | 3 | 1 | Placed | 0.01 | Laser welding |
| Example 17 | A5052 | C1100 | 2 | 1 | Not placed | 0 | Laser welding |

TABLE 2-continued

| | Al-based base material Type | Copper-based base material Type | Filler metal No. | Amount of filler metal added (g) per mm of weld length | Whether or not iron powder is placed on filler metal | Amount of iron powder added (g) per mm of weld length | Welding method |
|---|---|---|---|---|---|---|---|
| Example 18 | A5052 | C1100 | 3 | 1 | Not placed | 0 | Laser welding |
| Example 19 | A5052 | C1100 | 4 | 1 | Not placed | 0 | Laser welding |
| Example 20 | A5052 | C1100 | 1 | 1 | Placed | 0.01 | Laser welding |
| Example 21 | A5052 | C1100 | 2 | 1 | Placed | 0.01 | Laser welding |
| Example 22 | A5083 | C1100 | 1 | 3 | Not placed | 0 | Laser welding |
| Example 23 | A5083 | C1100 | 4 | 1 | Not placed | 0 | Laser welding |
| Example 24 | A5083 | C1100 | 5 | 1 | Not Placed | 0 | Laser welding |
| Example 25 | A5083 | C1100 | 1 | 1 | Placed | 0.01 | Laser welding |
| Example 26 | A5083 | C1100 | 2 | 1 | Placed | 0.01 | Laser welding |
| Example 27 | A6061 | C1100 | 1 | 1 | Not placed | 0 | Laser welding |
| Example 28 | A6061 | C1100 | 2 | 3 | Not placed | 0 | Laser welding |
| Example 29 | A6061 | C1100 | 3 | 1 | Not placed | 0 | Laser welding |
| Example 30 | A6061 | C1100 | 3 | 3 | Not placed | 0 | Laser welding |
| Example 31 | A6061 | C1100 | 5 | 1 | Not placed | 0 | Laser welding |
| Example 32 | A1050 | C1020 | 1 | 1 | Not placed | 0 | Laser welding |
| Example 33 | A1050 | C1020 | 2 | 3 | Not placed | 0 | Laser welding |
| Example 34 | A1050 | C1020 | 3 | 1 | Not placed | 0 | Laser welding |
| Example 35 | A1050 | C1020 | 3 | 3 | Not placed | 0 | Laser welding |
| Example 36 | A1050 | C1020 | 2 | 1 | Placed | 0.01 | Laser welding |
| Example 37 | A1050 | C1220 | 1 | 3 | Not placed | 0 | Laser welding |
| Example 38 | A1050 | C1220 | 2 | 3 | Not placed | 0 | Laser welding |
| Example 39 | A1050 | C1220 | 3 | 1 | Not placed | 0 | Laser welding |
| Example 40 | A1050 | C1220 | 4 | 1 | Not placed | 0 | Laser welding |
| Example 41 | A1050 | C1220 | 5 | 1 | Not placed | 0 | Laser welding |
| Example 42 | A1050 | C2100 | 1 | 3 | Not placed | 0 | Laser welding |
| Example 43 | A1050 | C2100 | 2 | 1 | Not placed | 0 | Laser welding |
| Example 44 | A1050 | C2100 | 2 | 3 | Not placed | 0 | Laser welding |
| Example 45 | A1050 | C2100 | 1 | 1 | Placed | 0.01 | Laser welding |
| Example 46 | A1050 | C2100 | 2 | 1 | Placed | 0.01 | Laser welding |
| Example 47 | A1050 | C1100 | 6 | 1 | Not placed | 0 | Laser welding |
| Example 48 | A1050 | C1100 | 8 | 3 | Not placed | 0 | Laser welding |
| Example 49 | A1050 | C1100 | 8 | 3 | Placed | 0.01 | Laser welding |
| Example 50 | A1050 | C1100 | 2 | 1 | Not placed | 0 | TIG welding |
| Example 51 | A1050 | C1100 | 3 | 1 | Not placed | 0 | TIG welding |
| Comparative Example 1 | A1050 | C1100 | 1 | 3 | Not placed | 0 | Laser welding |
| Comparative Example 2 | A1050 | C1100 | 7 | 1 | Not placed | 0 | Laser welding |
| Comparative Example 3 | A1050 | C1100 | 2 | 3 | Not placed | 0 | Laser welding |
| Comparative Example 4 | A1050 | C1100 | 1 | 3 | Placed | 0.01 | Laser welding |
| Comparative Example 5 | A1050 | C1100 | 7 | 1 | Placed | 0.01 | Laser welding |
| Comparative Example 6 | A1050 | C1100 | 7 | 3 | Placed | 0.01 | Laser welding |

TABLE 3

| | Aluminum-based base material Component composition (% by mass) | | | Weld metal portion | | | | | | | | Performance evaluation | | |
|---|---|---|---|---|---|---|---|---|---|---|---|---|---|---|
| | | | | Average component composition (% by mass) | | | | | | | Cu content (% by mass) at position N 300 μm away from boundary position B | Fe content (% by mass) in surface layer | Maximum load (N) in tensile shear | Ductility (%) |
| | Cu | Si | Zn | Cu | Si | Zn | Fe | Mn | Mg | P | | | | |
| Example 1 | 0.01 | 0.15 | 0.01 | 15 | 8 | 0.02 | 0.2 | 0 | 0 | 0 | 62 | 0.2 | 474 | 1.2 |
| Example 2 | 0.01 | 0.15 | 0.01 | 14 | 12 | 0.02 | 0.2 | 0 | 0 | 0 | 56 | 0.2 | 440 | 1.1 |
| Example 3 | 0.01 | 0.15 | 0.01 | 27 | 5 | 0.02 | 0.2 | 0 | 0 | 0 | 65 | 0.2 | 403 | 1.4 |
| Example 4 | 0.01 | 0.15 | 0.01 | 45 | 12 | 0.02 | 0.2 | 0 | 0 | 0 | 62 | 0.2 | 519 | 1.3 |
| Example 5 | 0.01 | 0.15 | 0.01 | 27 | 5 | 5.00 | 0.2 | 0 | 0 | 0 | 52 | 0.2 | 594 | 2.2 |
| Example 6 | 0.01 | 0.15 | 0.01 | 45 | 12 | 15.00 | 0.2 | 0 | 0 | 0 | 60 | 0.2 | 469 | 2.8 |
| Example 7 | 0.01 | 0.15 | 0.01 | 74 | 5 | 0.02 | 0.2 | 0 | 0 | 0 | 75 | 0.2 | 540 | 1.3 |
| Example 8 | 0.01 | 0.15 | 0.01 | 15 | 8 | 30.00 | 0.2 | 0 | 0 | 0 | 60 | 0.2 | 428 | 2.5 |
| Example 9 | 0.01 | 0.15 | 0.01 | 15 | 8 | 0.02 | 0.3 | 0 | 0 | 0 | 53 | 1.0 | 703 | 1.2 |
| Example 10 | 0.01 | 0.15 | 0.01 | 27 | 5 | 0.02 | 0.3 | 0 | 0 | 0 | 60 | 1.0 | 730 | 1.2 |
| Example 11 | 0.01 | 0.15 | 0.01 | 27 | 5 | 5.00 | 0.3 | 0 | 0 | 0 | 61 | 1.0 | 639 | 2.4 |
| Example 12 | 0.10 | 0.25 | 0.05 | 15 | 8 | 0.02 | 0.2 | 0.25 | 0 | 0 | 59 | 0.2 | 502 | 1.4 |
| Example 13 | 0.10 | 0.25 | 0.05 | 27 | 5 | 0.02 | 0.2 | 0.25 | 0 | 0 | 62 | 0.2 | 424 | 1.3 |
| Example 14 | 0.10 | 0.25 | 0.05 | 27 | 5 | 5.00 | 0.2 | 0.25 | 0 | 0 | 65 | 0.2 | 546 | 2.1 |
| Example 15 | 0.10 | 0.25 | 0.05 | 45 | 12 | 15.00 | 0.2 | 0.25 | 0 | 0 | 57 | 0.2 | 418 | 2.5 |
| Example 16 | 0.10 | 0.25 | 0.05 | 27 | 5 | 5.00 | 0.3 | 0.25 | 0 | 0 | 66 | 1.0 | 607 | 2.5 |
| Example 17 | 0.02 | 0.10 | 0.01 | 27 | 5 | 0.02 | 0.2 | 0 | 0.3 | 0 | 65 | 0.2 | 509 | 1.2 |

TABLE 3-continued

| | Aluminum-based base material Component composition (% by mass) | | | Weld metal portion Average component composition (% by mass) | | | | | | | Cu content (% by mass) at position N 300 μm away from boundary position B | Fe content (% by mass) in surface layer | Performance evaluation Maximum load (N) in tensile shear | Ductility (%) |
|---|---|---|---|---|---|---|---|---|---|---|---|---|---|---|
| | Cu | Si | Zn | Cu | Si | Zn | Fe | Mn | Mg | P | | | | |
| Example 18 | 0.02 | 0.10 | 0.01 | 27 | 5 | 5.00 | 0.2 | 0 | 0.3 | 0 | 55 | 0.2 | 436 | 2.1 |
| Example 19 | 0.02 | 0.10 | 0.01 | 74 | 5 | 0.02 | 0.2 | 0 | 0.3 | 0 | 75 | 0.2 | 591 | 1.3 |
| Example 20 | 0.02 | 0.10 | 0.01 | 15 | 8 | 0.02 | 0.3 | 0 | 0.3 | 0 | 53 | 1.0 | 788 | 1.3 |
| Example 21 | 0.02 | 0.10 | 0.01 | 27 | 5 | 0.02 | 0.3 | 0 | 0.3 | 0 | 53 | 1.0 | 709 | 1.7 |
| Example 22 | 0.01 | 0.10 | 0.05 | 14 | 12 | 0.02 | 0.2 | 0.10 | 1.8 | 0 | 63 | 0.2 | 532 | 1.4 |
| Example 23 | 0.01 | 0.10 | 0.05 | 74 | 5 | 0.02 | 0.2 | 0.10 | 1.8 | 0 | 75 | 0.2 | 509 | 1.4 |
| Example 24 | 0.01 | 0.10 | 0.05 | 15 | 5 | 30.00 | 0.2 | 0.10 | 1.8 | 0 | 73 | 0.2 | 525 | 2.7 |
| Example 25 | 0.01 | 0.10 | 0.05 | 15 | 8 | 0.02 | 0.3 | 0.10 | 1.8 | 0 | 63 | 1.0 | 745 | 1.5 |
| Example 26 | 0.01 | 0.10 | 0.05 | 27 | 5 | 0.02 | 0.3 | 0.10 | 1.8 | 0 | 68 | 1.0 | 782 | 1.4 |
| Example 27 | 0.25 | 0.50 | 0.10 | 15 | 8 | 0.02 | 0.2 | 0 | 0.3 | 0 | 74 | 0.2 | 425 | 1.4 |
| Example 28 | 0.25 | 0.50 | 0.10 | 45 | 12 | 0.02 | 0.2 | 0 | 0.3 | 0 | 54 | 0.2 | 429 | 1.5 |
| Example 29 | 0.25 | 0.50 | 0.10 | 27 | 5 | 5.00 | 0.2 | 0 | 0.3 | 0 | 59 | 0.2 | 474 | 2.6 |
| Example 30 | 0.25 | 0.50 | 0.10 | 45 | 12 | 15.00 | 0.2 | 0 | 0.3 | 0 | 70 | 0.2 | 454 | 2.4 |
| Example 31 | 0.25 | 0.50 | 0.10 | 15 | 5 | 30.00 | 0.2 | 0 | 0.3 | 0 | 67 | 0.2 | 423 | 2.5 |
| Example 32 | 0.01 | 0.15 | 0.01 | 15 | 8 | 0.02 | 0.2 | 0 | 0 | 0 | 61 | 0.2 | 505 | 1.8 |
| Example 33 | 0.01 | 0.15 | 0.01 | 45 | 12 | 0.02 | 0.2 | 0 | 0 | 0 | 74 | 0.2 | 412 | 1.2 |
| Example 34 | 0.01 | 0.15 | 0.01 | 27 | 5 | 5.00 | 0.2 | 0 | 0 | 0 | 50 | 0.2 | 411 | 2.3 |
| Example 35 | 0.01 | 0.15 | 0.01 | 45 | 12 | 15.00 | 0.2 | 0 | 0 | 0 | 54 | 0.2 | 583 | 2.4 |
| Example 36 | 0.01 | 0.15 | 0.01 | 27 | 5 | 0.02 | 0.3 | 0 | 0 | 0 | 70 | 1.0 | 621 | 1.2 |
| Example 37 | 0.01 | 0.15 | 0.01 | 14 | 12 | 0.02 | 0.2 | 0 | 0 | 0.01 | 80 | 0.2 | 582 | 1.3 |
| Example 38 | 0.01 | 0.15 | 0.01 | 45 | 12 | 0.02 | 0.2 | 0 | 0 | 0.01 | 74 | 0.2 | 545 | 1.2 |
| Example 39 | 0.01 | 0.15 | 0.01 | 27 | 5 | 5.00 | 0.2 | 0 | 0 | 0.01 | 57 | 0.2 | 474 | 2.5 |
| Example 40 | 0.01 | 0.15 | 0.01 | 74 | 5 | 0.02 | 0.2 | 0 | 0 | 0.01 | 75 | 0.2 | 591 | 1.4 |
| Example 41 | 0.01 | 0.15 | 0.01 | 15 | 5 | 30.00 | 0.2 | 0 | 0 | 0.01 | 61 | 0.2 | 510 | 2.4 |
| Example 42 | 0.01 | 0.15 | 0.01 | 14 | 12 | 0.02 | 0.2 | 0 | 0 | 0 | 55 | 0.2 | 499 | 1.2 |
| Example 43 | 0.01 | 0.15 | 0.01 | 27 | 5 | 0.02 | 0.2 | 0 | 0 | 0 | 71 | 0.2 | 561 | 1.9 |
| Example 44 | 0.01 | 0.15 | 0.01 | 45 | 12 | 0.02 | 0.2 | 0 | 0 | 0 | 69 | 0.2 | 599 | 1.3 |
| Example 45 | 0.01 | 0.15 | 0.01 | 15 | 8 | 0.02 | 0.3 | 0 | 0 | 0 | 50 | 1.0 | 615 | 1.4 |
| Example 46 | 0.01 | 0.15 | 0.01 | 27 | 5 | 0.02 | 0.3 | 0 | 0 | 0 | 74 | 1.0 | 742 | 1.9 |
| Example 47 | 0.01 | 0.15 | 0.01 | 27 | 5 | 0.02 | 1.0 | 0 | 0 | 0 | 73 | 1.0 | 497 | 1.5 |
| Example 48 | 0.01 | 0.15 | 0.01 | 30 | 5 | 31.00 | 0.2 | 0 | 0 | 0 | 60 | 0.2 | 489 | 1.0 |
| Example 49 | 0.01 | 0.15 | 0.01 | 30 | 5 | 31.00 | 0.3 | 0 | 0 | 0 | 60 | 1.0 | 481 | 1.0 |
| Example 50 | 0.01 | 0.15 | 0.01 | 27 | 5 | 0.02 | 0.2 | 0 | 0 | 0 | 77 | 0.2 | 588 | 1.1 |
| Example 51 | 0.01 | 0.15 | 0.01 | 27 | 5 | 5.00 | 0.2 | 0 | 0 | 0 | 78 | 0.2 | 580 | 1.0 |
| Comparative Example 1 | 0.01 | 0.15 | 0.01 | 14 | 14 | 0.02 | 0.2 | 0 | 0 | 0 | 57 | 0.2 | 713 | 0.2 |
| Comparative Example 2 | 0.01 | 0.15 | 0.01 | 40 | 0.1 | 0.02 | 0.2 | 0 | 0 | 0 | 65 | 0.2 | 376 | 2.4 |
| Comparative Example 3 | 0.01 | 0.15 | 0.01 | 75 | 8 | 0.02 | 0.2 | 0 | 0 | 0 | 75 | 0.2 | 768 | 0.2 |
| Comparative Example 4 | 0.01 | 0.15 | 0.01 | 14 | 14 | 0.02 | 0.3 | 0 | 0 | 0 | 57 | 1.0 | 607 | 0.2 |
| Comparative Example 5 | 0.01 | 0.15 | 0.01 | 40 | 0.1 | 0.02 | 0.3 | 0 | 0 | 0 | 65 | 1.0 | 264 | 2.4 |
| Comparative Example 6 | 0.01 | 0.15 | 0.01 | 75 | 8 | 0.02 | 0.3 | 0 | 0 | 0 | 75 | 1.0 | 682 | 0.2 |

(Note)
The underlined bold characters in the table 3 mean being outside propriety in the present disclosure or that the performance is not at an acceptable level.

From the results in Table 3, Examples 1 to 51 all had a tensile shear load in the range of 403 to 788 N and had a joint strength at an acceptable level, and also for the ductility, the calculated numerical value was in the range of 1.0 to 2.8% and at an acceptable level. On the other hand, in all of Comparative Examples 1 to 6, either the joint strength or the ductility was not at an acceptable level.

According to the present disclosure, a welded joint having high joint strength and having excellent ductility can be provided. This welded joint being able to be applied to, for example, electrodes and bus bars for Li ion batteries, and electrodes, terminals, and wiring for electronic devices and wire harnesses. In addition, application is particularly expected in such wide-ranging fields that the use of a welded joint formed by the joining of different types of metal materials, an aluminum-based base material and a copper-based base material to each other is needed, for the purpose of promoting weight reduction and the like.

What is claimed is:
1. A welded joint comprising an aluminum-based base material comprising an aluminum alloy or pure aluminum and a copper-based base material comprising a copper alloy or pure copper joined by a weld metal portion, wherein the weld metal portion contains copper in ranges of less than 75% by mass and silicon in ranges of less than 13% by mass and has a higher content of copper and silicon than the aluminum-based base material.
2. The welded joint according to claim 1, wherein the weld metal portion further contains zinc in a range of 30% by mass or less and has a higher content of zinc than the aluminum-based base material.

3. The welded joint according to claim 2, wherein copper content of the weld metal portion is less than 75% by mass when the weld metal portion is measured at a position in the weld metal portion 300 μm away from a boundary surface between the copper-based base material and the weld metal portion.

4. The welded joint according to claim 3, wherein the weld metal portion further contains iron, and the iron is present in a concentrated state at a surface of the weld metal portion.

5. The welded joint according to claim 2, wherein the weld metal portion further contains iron, and the iron is present in a concentrated state at a surface of the weld metal portion.

6. The welded joint according to claim 1, wherein copper content of the weld metal portion is less than 75% by mass when the weld metal portion is measured at a position in the weld metal portion 300 μm away from a boundary surface between the copper-based base material and the weld metal portion.

7. The welded joint according to claim 6, wherein the weld metal portion further contains iron, and the iron is present in a concentrated state at a surface of the weld metal portion.

8. The welded joint according to claim 1, wherein the weld metal portion further contains iron, and the iron is present in a concentrated state at a surface of the weld metal portion.

* * * * *